(12) United States Patent
Wang et al.

(10) Patent No.: US 7,467,894 B2
(45) Date of Patent: Dec. 23, 2008

(54) LINEAR MOTION GUIDE APPARATUS HAVING BALL RETAINING DEVICE

(75) Inventors: Chin Pei Wang, Taichung (TW); Chiung Hui Tsai, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 317 days.

(21) Appl. No.: 11/434,463

(22) Filed: May 15, 2006

(65) Prior Publication Data

US 2007/0263950 A1 Nov. 15, 2007

(51) Int. Cl.
*F16C 29/06* (2006.01)
(52) U.S. Cl. ............................ 384/45; 384/43
(58) Field of Classification Search ............. 384/13–15, 384/43–45
See application file for complete search history.

(56) References Cited

U.S. PATENT DOCUMENTS

| | | | | | |
|---|---|---|---|---|---|
| 3,189,309 | A | * | 6/1965 | Hager | 248/478 |
| 4,538,157 | A | * | 8/1985 | Jones | 347/76 |
| 4,538,786 | A | * | 9/1985 | Manning | 248/544 |
| 4,949,933 | A | * | 8/1990 | Stone | 248/442.2 |
| 5,102,235 | A | * | 4/1992 | Mugglestone | 384/43 |
| 5,295,748 | A | * | 3/1994 | Yamazaki | 384/45 |
| 5,340,219 | A | * | 8/1994 | Agari | 384/15 |
| 5,451,109 | A | * | 9/1995 | Ichida | 384/15 |
| 5,544,954 | A | | 8/1996 | Osawa | 384/45 |
| 6,170,986 | B1 | * | 1/2001 | Hsu et al. | 384/15 |
| 6,200,031 | B1 | * | 3/2001 | Faulhaber et al. | 384/45 |
| 6,210,040 | B1 | * | 4/2001 | Mischler | 384/45 |
| 6,520,681 | B2 | | 2/2003 | Ishihara | 384/45 |
| 6,558,039 | B2 | * | 5/2003 | Wu | 384/45 |
| 7,121,724 | B2 | * | 10/2006 | Lee et al. | 384/45 |
| 7,234,867 | B2 | * | 6/2007 | Ishihara | 384/45 |
| 7,303,335 | B2 | * | 12/2007 | Kato et al. | 384/45 |

\* cited by examiner

*Primary Examiner*—Marcus Charles
(74) *Attorney, Agent, or Firm*—Charles E. Baxley

(57) ABSTRACT

A linear motion guide apparatus includes a housing having a chamber formed by two side walls for slidably receiving an elongated track rail, one or more endless ball rolling passages are formed in the housing for receiving a number of bearing members, one or more ball retaining devices each include an elongated rod for engaging with the bearing members and for retaining the bearing members to the housing, and a fastening device for fastening the ball retaining device to the housing and to prevent the ball retaining device and the bearing members from being disengaged from the housing. A fastener may be used for fastening each of the end portions of the ball retaining device to the housing.

5 Claims, 4 Drawing Sheets

LINEAR MOTION GUIDE APPARATUS HAVING BALL RETAINING DEVICE

BACKGROUND OF THE INVENTION

1. Field of the Invention

The present invention relates to a linear motion guide apparatus, and more particularly to a linear motion guide apparatus having a ball retaining device for stably and solidly retaining balls or rollers therein and for preventing the balls or rollers from being disengaged from the linear motion guide apparatus.

2. Description of the Prior Art

Various kinds of typical linear motion guide apparatuses have been developed and comprise a bearing device or a slider slidably attached onto an elongated track rail and movable along the elongated track rail which is normally arranged or disposed or provided on a stationary portion, such as a bed of a machine tool, for guiding a movable member, such as a table along the elongated track rail.

For example, U.S. Pat. No. 5,544,954 to Osawa discloses one of the typical linear motion guide apparatuses and also comprises a bearing device or a slider slidably attached onto and movable along an elongated track rail, a number of endless rolling elements or bearing elements disposed between the slider and the elongated track rail for smoothly guiding the slider to move along the elongated track rail, and one or more ball retainers attached to the slider for engaging with the rolling elements or bearing elements or balls or rollers and for stably attaching the balls or rollers to the slider, and for preventing the balls or rollers from being disengaged from the slider.

For preventing the balls retainers from being disengaged from the slider, the balls retainers each include two end locking parts or curved portions for engaging with the slider and for stably attaching the balls retainers to the slider. However, the curved end portions of the balls retainers have not be solidly secured to the slider and may be easily disengaged from the slider when the balls or rollers are forced or moved against the balls retainers, such that the balls or rollers may have a good chance to be disengaged from the slider.

U.S. Pat. No. 6,520,681 to Ishihara discloses another typical linear motion guide apparatus also comprising one or more endless rolling elements or bearing elements disposed between a slider and an elongated track rail, for smoothly guiding the slider to move along the elongated track rail, and comprising two frames attached to an outer housing, for retaining or attaching the endless rolling elements or bearing elements between the frames and the outer housing, and one or more ball retainers attached to the slider for engaging with the rolling elements or bearing elements or balls or rollers and for stably attaching the balls or rollers to the slider, and for preventing the balls or rollers from being disengaged from the slider.

The balls retainers each also include two bent engaging ends for engaging with the slider and for stably attaching the balls retainers to the slider. However, the bent engaging end portions of the balls retainers also have not be solidly secured to the slider and may also be easily disengaged from the slider when the balls or rollers are forced or moved against the balls retainers, such that the balls or rollers may also have a good chance to be disengaged from the slider.

The present invention has arisen to mitigate and/or obviate the afore-described disadvantages of the conventional linear motion guide apparatuses.

SUMMARY OF THE INVENTION

The primary objective of the present invention is to provide a linear motion guide apparatus including a ball retaining device for stably retaining balls or rollers therein and for preventing the balls or rollers from being disengaged from the linear motion guide apparatus.

In accordance with one aspect of the invention, there is provided a linear motion guide apparatus comprising a housing including a chamber formed therein and defined by two side walls for slidably receiving an elongated track rail, and including at least one endless ball rolling passage formed therein, a number of bearing members received in the endless ball rolling passage of the housing, at least one ball retaining device including an elongated rod for engaging with the bearing members and for retaining the bearing members to the housing, and a fastening device for fastening the ball retaining device to the housing and to prevent the ball retaining device and the bearing members from being disengaged from the housing.

The endless ball rolling passage of the housing includes a first portion disposed distal to the bearing members, and a second portion disposed closer to the bearing members and communicating with the chamber of the housing for allowing the bearing members to be engaged with the elongated track rail.

The elongated rod of the ball retaining device is engaged in the second portion of the endless ball rolling passage of the housing and engaged with the bearing members.

The housing includes two curved end portions provided in end portions of the first and the second portions of the endless ball rolling passage of the housing for communicating the first and the second portions of the endless ball rolling passage of the housing with each other and for forming the endless ball rolling passage of the housing. The housing includes two end caps attached to the housing and having the curved end portions formed in the end caps respectively.

The ball retaining device includes two end portions for fastening to the housing. The fastening device includes a fastener for engaging with and for securing each of the end portions of the ball retaining device to the housing. The ball retaining device includes a ring provided on each of the end portions of the ball retaining device for attaching the fastener. The ring includes a bore formed therein for engaging with the fastener.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
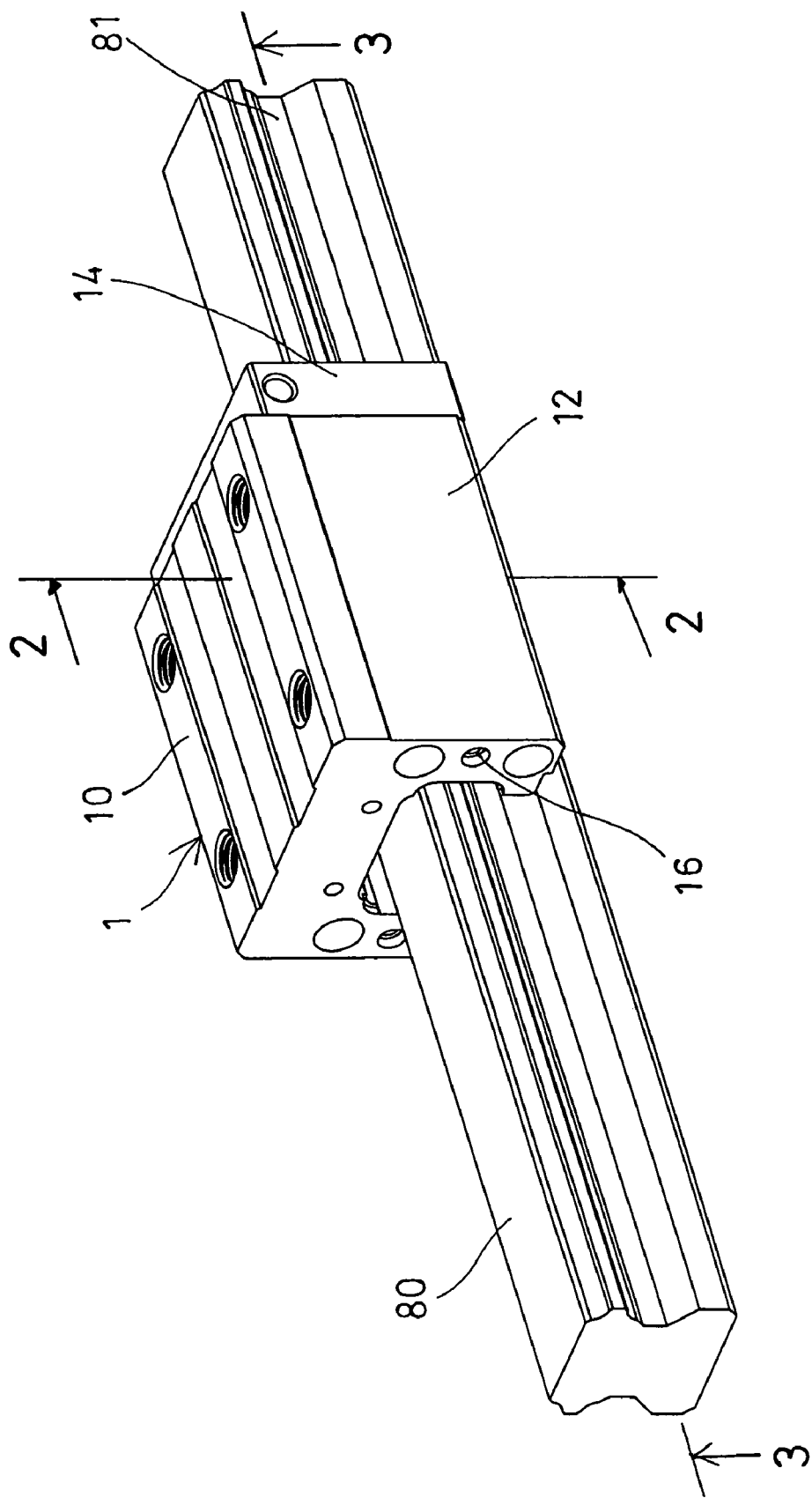
FIG. 1 is a perspective view of a linear motion guide apparatus in accordance with the present invention.
Figure 3:
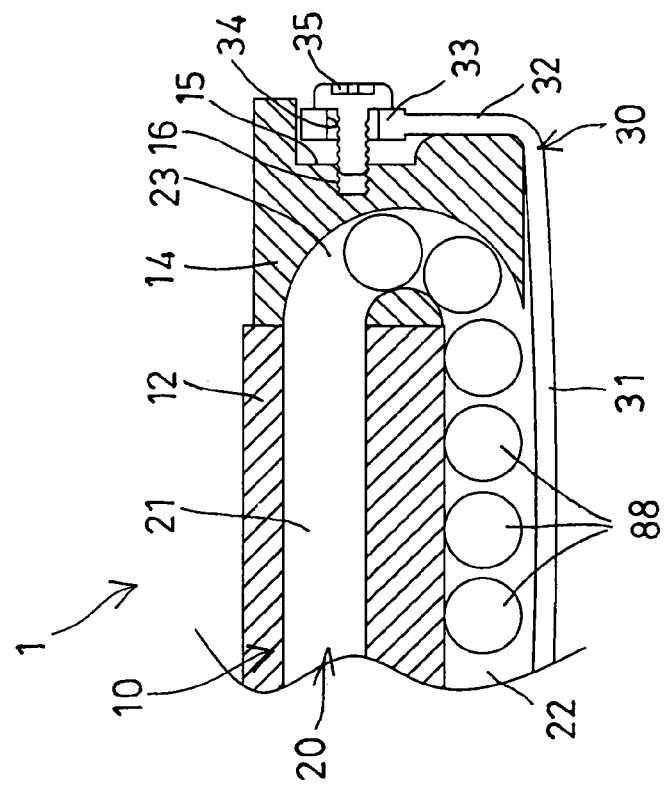
FIG. 3 is an enlarged partial cross sectional view of the linear motion guide apparatus, taken along lines 3-3 of FIG. 1.
Figure 2:
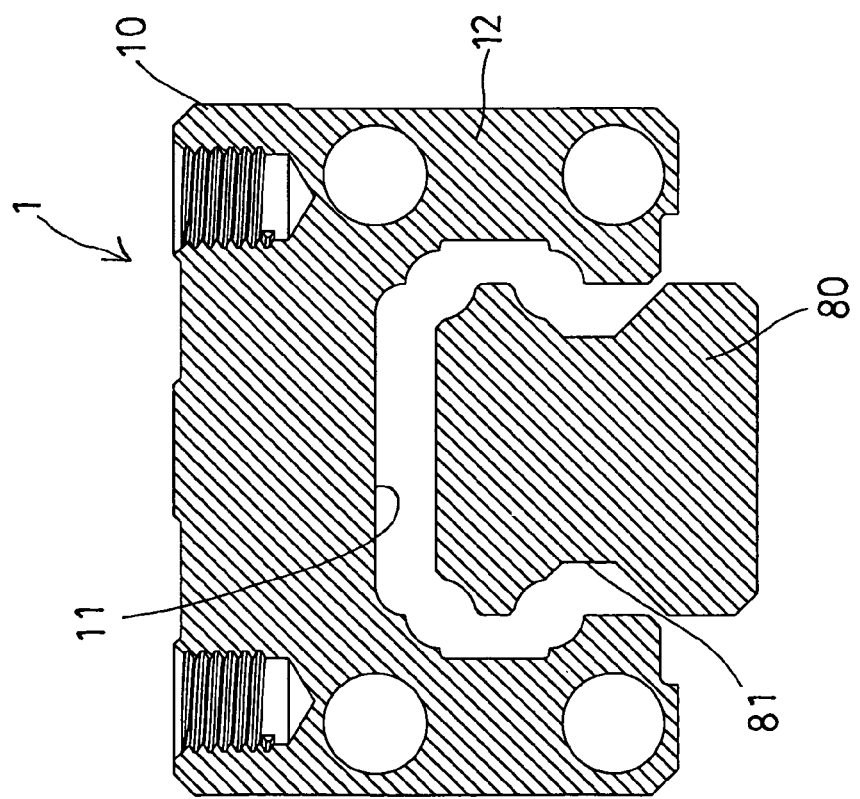
FIG. 2 is a cross sectional view of the linear motion guide apparatus, taken along lines 2-2 of FIG. 1.

Referring to the drawings, and initially to FIGS. 1-3, a linear motion guide apparatus in accordance with the present invention comprises a main body device or a slider 1 slidably attached onto an elongated track rail 80 and movable along the elongated track rail 80 which is normally arranged or disposed on a stationary portion, such as a bed of a machine tool (not shown), for guiding a movable member, such as a table (not shown) along the elongated track rail 80.

The slider 1 includes an outer housing 10 having a chamber 11 formed therein (FIG. 2) and defined by two side walls 12 for slidably receiving the elongated track rail 80 and for slidably attaching outer housing 10 onto the elongated track rail 80. The outer housing 10 includes one or more endless ball rolling passages 20 formed therein (FIGS. 3-4), such as formed in each of the two side walls 12 for slidably receiving balls or rollers or bearing members 88 therein. The elongated track rail 80 includes two side recesses 81 formed therein for stably retaining and confining the bearing members 88 and thus for allowing the bearing members 88 to be stably engaged with the elongated track rail 80.

Figure 4:
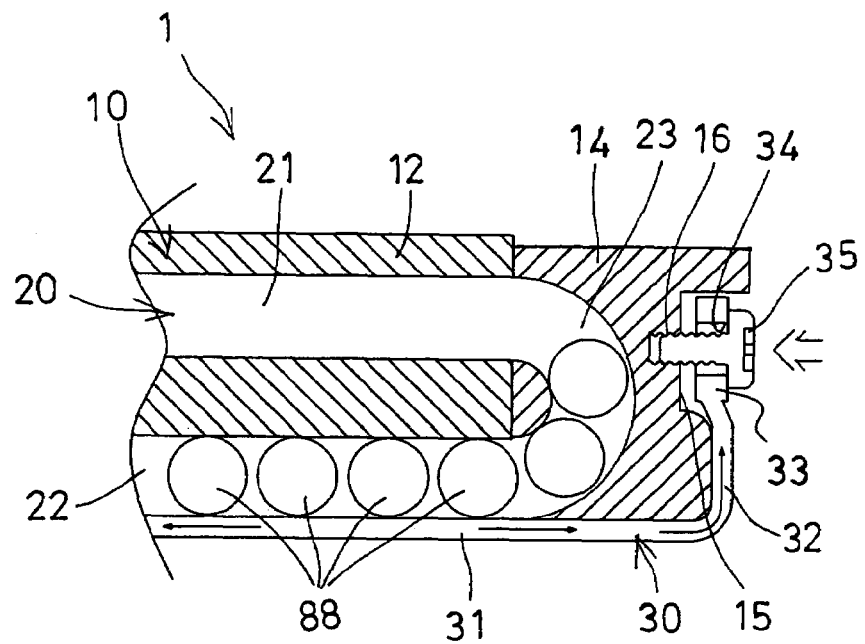
FIG. 4 is an enlarged partial cross sectional view similar to FIG. 3, illustrating the operation of the linear motion guide apparatus.

As shown in FIGS. 3-4, the endless ball rolling passages 20 of the housing 10 each include a first relatively inner portion or area 21 deeply formed or provided in the housing 10 and spaced away from the bearing members 88 or disposed distal to the bearing members 88, a second or relatively outer portion or area 22 also formed or provided in the housing 10 but arranged or disposed closer to the bearing members 88 and communicating with the chamber 11 of the housing 10 for allowing the bearing members 88 to be engaged with the elongated track rail 80.

The endless ball rolling passages 20 of the housing 10 each may further include one or more, such as two curved end portions 23 formed or provided in the end portions of the respective endless ball rolling passages 20 for communicating the end portions of the inner and the outer portions or areas 21, 22 with each other and thus for forming the endless ball rolling passages 20 in the housing 10. The housing 10 may further include one or more, such as two end caps 14 attached or secured to the two ends of the housing 10 and having the curved end portions 23 formed or provided in the respective end caps 14.

Figure 5:
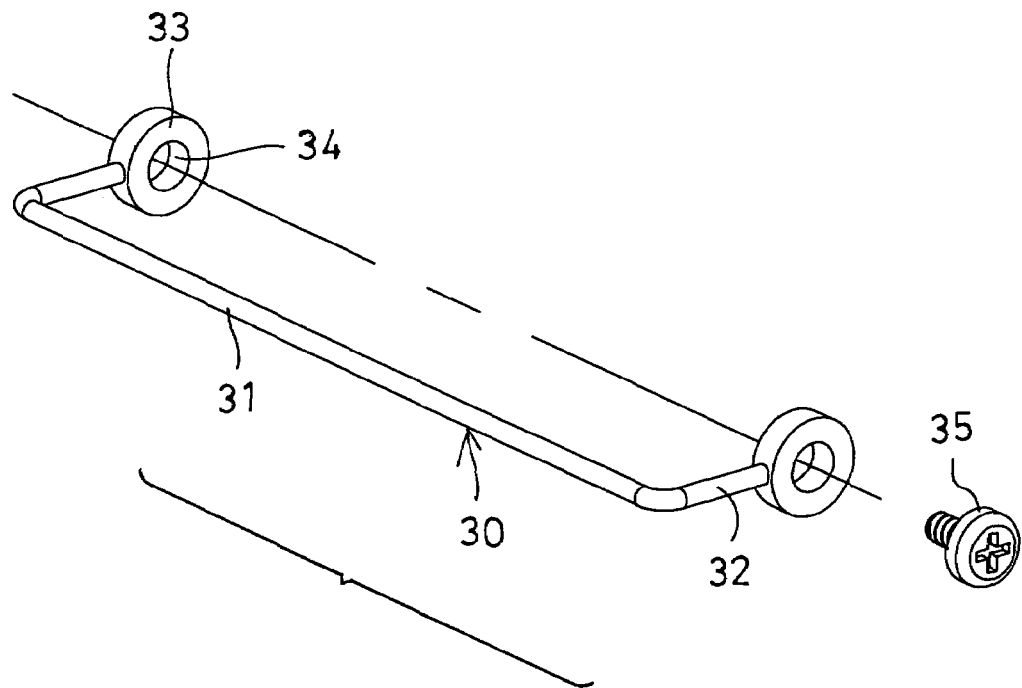
FIG. 5 is a partial exploded view illustrating an arrangement of a ball retaining device for the linear motion guide apparatus.

The slider 1 further includes one or more ball retaining devices 30 attached to the housing 10 and/or the end caps 14 for engaging with the bearing members 88 and thus for stably retaining the bearing members 88 in the respective endless ball rolling passages 20 of the housing 10. For example, the ball retaining devices 30 each include an elongated rod 31 for engaging in or with the relatively outer portion or area 22 of the endless ball rolling passages 20 of the housing 10, and for engaging with the bearing members 88, and two end portions 32 each having a ring 33 formed or provided thereon, and the rings 33 each include a bore 34 formed therein for engaging or receiving a fastener 35 therein, best shown in FIGS. 3-5.

As best shown in FIGS. 3-4, the housing 10 may further include one or more recesses 15 formed therein for such as receiving the end portions 32 or the rings 33 of the ball retaining devices 30, and one or more screw holes 16 formed therein and communicating with the recesses 15 for threading with the fastener 35, and for allowing the ball retaining devices 30 to be stably and solidly attached or secured to the housing 10 and/or the end caps 14, and for preventing the ball retaining devices 30 from being disengaged from the housing 10 and/or the end caps 14.

In operation, as shown in FIG. 4, the fasteners 35 may be used to stably and solidly attached or secured the end portions 32 or the rings 33 of the ball retaining devices 30 to the housing 10 and/or the end caps 14, and may stretch the ball retaining devices 30 to apply a tension stress against the bearing members 88 and thus for allowing the ball retaining devices 30 to stably and solidly retain the bearing members 88 to the housing 10 and for preventing the bearing members 88 from being disengaged from the housing 10. The ball retaining devices 30 may thus be used and acted as a tension stress applying means or device or may be actuated by a forcing means to apply the tension stress against the bearing members 88 and to stably and solidly retain the bearing members 88 to the housing 10.

The typical linear motion guide apparatuses failed to provide a securing or fastening means or device for solidly attaching or securing or fastening the end portions 32 or the rings 33 of the ball retaining devices 30 to the housing 10 and/or the end caps 14, and failed to provide a securing or fastening means or device for applying a tension stress against the bearing members 88 to stably and solidly retain the bearing members 88 to the housing 10.

Figure 6:
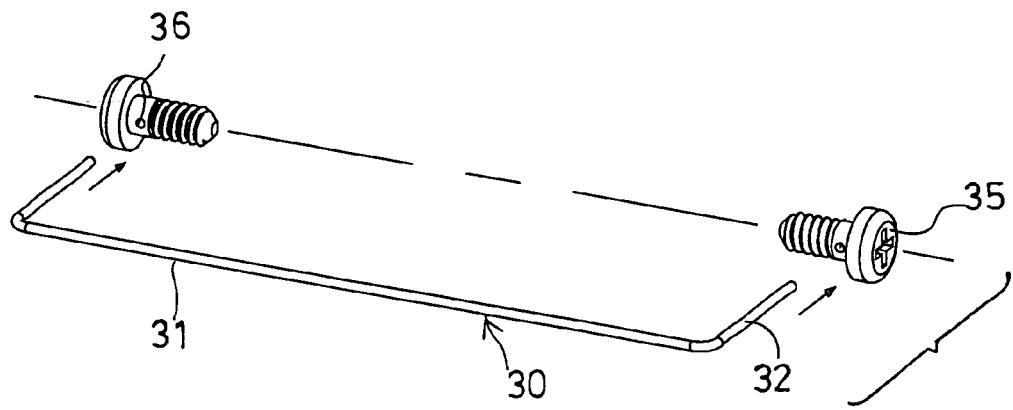
FIG. 6 is a partial exploded view similar to FIG. 5, illustrating the other arrangement of the linear motion guide apparatus.
Figure 7:
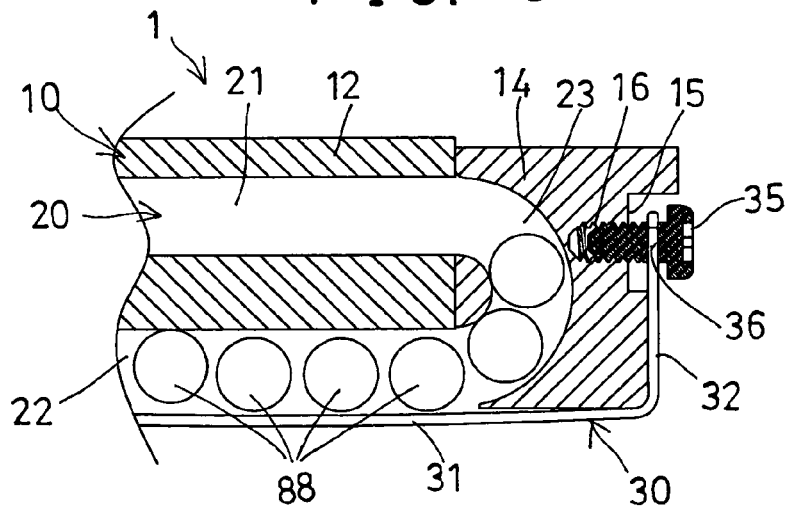
FIG. 7 is an enlarged partial cross sectional view illustrating the ball retaining device as shown in FIG. 6.
Figure 8:
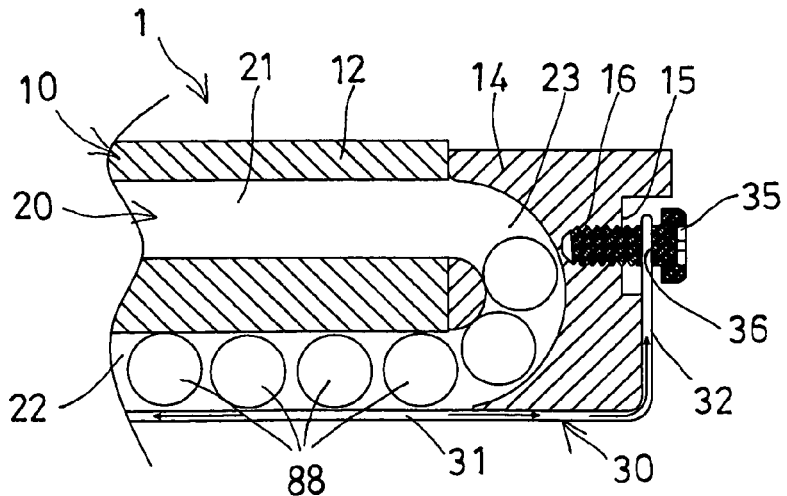
FIG. 8 is an enlarged partial cross sectional view similar to FIG. 7, illustrating the operation of the linear motion guide apparatus as shown in FIGS. 6-7.

As shown in FIGS. 6-8, alternatively, the fasteners 35 may each include a groove 36 formed therein for engaging or receiving the end portions 32 of the ball retaining devices 30, and also for allowing the ball retaining devices 30 to be stably and solidly attached or secured to the housing 10 and/or the end caps 14 with the fasteners 35. In operation, as shown in FIG. 8, the fasteners 35 may also be used to stably and solidly attached or secured the end portions 32 or the rings 33 of the ball retaining devices 30 to the housing 10 and/or the end caps 14, and may slightly stretch the ball retaining devices 30 for allowing the ball retaining devices 30 to stably and solidly retain the bearing members 88 to the housing 10 and for preventing the bearing members 88 from being disengaged from the housing 10.

Accordingly, the linear motion guide apparatus in accordance with the present invention includes a device for stably retaining balls or rollers therein and for preventing the balls or rollers from being disengaged from the linear motion guide apparatus.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide apparatus comprising:
   a housing including a chamber formed therein and defined by two side walls for slidably receiving an elongated track rail, and including at least one endless ball rolling passage formed therein,
   a plurality of bearing members received in said at least one endless ball rolling passage of said housing,
   at least one ball retaining device including an elongated rod for engaging with said bearing members and for retaining said bearing members to said housing, and including two end portions for fastening to said housing, and including a ring provided on each of said end portions of said at least one ball retaining device, and including a bore formed in each of said rings, and two fasteners engaged with said rings respectively to secure said end portions of said at least one ball retaining device to said housing and for forcing said at least one ball retaining device to apply a tension stress against said bearing members and to solidly retain said bearing members to said housing and to prevent said at least one ball retaining device and said bearing members from being disengaged from said housing.

2. The linear motion guide apparatus as claimed in claim 1, wherein said at least one endless ball rolling passage of said housing includes a first portion disposed distal to said bearing members, and a second portion disposed closer to said bearing members and communicating with said chamber of said housing for allowing said bearing members to be engaged with said elongated track rail.

3. The linear motion guide apparatus as claimed in claim 2, wherein said elongated rod of said at least one ball retaining device is engaged in said second portion of said at least one endless ball rolling passage of said housing and engaged with said bearing members.

4. The linear motion guide apparatus as claimed in claim 2, wherein said housing includes two curved end portions provided in end portions of said first and said second portions of said at least one endless ball rolling passage of said housing for communicating said first and said second portions of said at least one endless ball rolling passage of said housing with each other and for forming said at least one endless ball rolling passage of said housing.

5. The linear motion guide apparatus as claimed in claim 4, wherein said housing includes two end caps attached to said housing and having said curved end portions formed in said end caps respectively.

\* \* \* \* \*